US009625616B2

(12) United States Patent
Liu et al.

(10) Patent No.: US 9,625,616 B2
(45) Date of Patent: Apr. 18, 2017

(54) SILICONE HYDROGEL CONTACT LENSES

(71) Applicant: CooperVision International Holding Company, LP, St. Michael (BB)

(72) Inventors: Yuwen Liu, Dublin, CA (US); AKM Shahab Siddiqui, Pleasanton, CA (US); Yuan Ji, San Jose, CA (US); Junhao Ge, Fremont, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 0 days.

(21) Appl. No.: 14/768,869

(22) PCT Filed: Mar. 14, 2014

(86) PCT No.: PCT/GB2014/050772
§ 371 (c)(1),
(2) Date: Aug. 19, 2015

(87) PCT Pub. No.: WO2014/140599
PCT Pub. Date: Sep. 18, 2014

(65) Prior Publication Data
US 2016/0003980 A1   Jan. 7, 2016

Related U.S. Application Data

(60) Provisional application No. 61/787,024, filed on Mar. 15, 2013.

(51) Int. Cl.
*C08L 83/06* (2006.01)
*G02B 1/04* (2006.01)
*B29D 11/00* (2006.01)

(52) U.S. Cl.
CPC .......... *G02B 1/043* (2013.01); *B29D 11/0025* (2013.01); *B29D 11/00192* (2013.01); *C08L 83/06* (2013.01)

(58) Field of Classification Search
None
See application file for complete search history.

(56) References Cited

U.S. PATENT DOCUMENTS

| | | | | |
|---|---|---|---|---|
| 4,173,606 A | * | 11/1979 | Stoy | B29C 39/00 210/500.23 |
| 6,765,083 B2 | * | 7/2004 | Ford | C08G 77/34 134/31 |
| 2007/0138668 A1 | * | 6/2007 | Lai | G02B 1/043 264/1.32 |
| 2007/0228585 A1 | * | 10/2007 | Vanderlaan | B29C 37/0003 264/1.1 |
| 2008/0048350 A1 | * | 2/2008 | Chen | C08L 83/14 264/2.6 |
| 2010/0296049 A1 | * | 11/2010 | Justynska | B29D 11/00038 351/159.33 |
| 2010/0298446 A1 | * | 11/2010 | Chang | C08F 230/08 514/772.4 |
| 2011/0319509 A1 | * | 12/2011 | Dorgan | C08G 63/08 521/81 |
| 2012/0046437 A1 | * | 2/2012 | Coady | C08G 63/823 528/336 |
| 2016/0003980 A1 | * | 1/2016 | Liu | B29D 11/00192 523/107 |

FOREIGN PATENT DOCUMENTS

| WO | | 0236669 A2 | 5/2002 | |
|---|---|---|---|---|
| WO | WO | 0236669 A2 | * 5/2002 | ............. C08G 77/34 |

OTHER PUBLICATIONS

International Search Report and Written Opinion issued in corresponding International Patent Application No. PCT/GB2014/050772 dated Jun. 5, 2014 (11 pages).
Written Opinion of the International Preliminary Examining Authority (Second Written Opinion) issued in corresponding International Patent Application No. PCT/GB2014/050772 dated Feb. 16, 2015 (5 pages).
International Preliminary Report on Patentability issued in corresponding International Patent Application No. PCT/GB2014/050772 dated May 11, 2015 (with Response to 2nd WO filed Mar. 27, 2015 and Article 34 claims) (11 pages).

* cited by examiner

*Primary Examiner* — Peter A Salamon
(74) *Attorney, Agent, or Firm* — Kilyk & Bowersox, P.L.L.C.

(57) ABSTRACT

A method is provided for manufacturing ophthalmically-acceptable, distortion-free silicone hydrogel contact lenses without the use of volatile organic solvents in the manufacturing process. The contact lenses are extract with an extraction liquid comprising an aqueous solution of a non-volatile organic solvent, such as ethyl lactate.

10 Claims, No Drawings

SILICONE HYDROGEL CONTACT LENSES

This application is a National Stage Application of PCT/GB2014/050772, filed Mar. 14, 2014, which claims the benefit under 35 U.S.C. §119(e) of prior U.S. Provisional Patent Application No. 61/787,024, filed Mar. 15, 2013.

FIELD

The field of the invention relates to silicone hydrogel contact lenses.

BACKGROUND

Contact lenses made from silicone hydrogels are rapidly gaining popularity over contact lenses made from conventional hydrogel materials because, like conventional hydrogel lenses, they are comfortable to wear, but they have the added advantage of having higher oxygen permeability, which is believed to be healthier for the eye. However, contact lenses made from silicone hydrogels typically need to be washed in volatile organic solvents to extract unreacted components from the lenses. The use of volatile organic solvents in manufacturing presents safety and environmental concerns and adds costs to the manufacturing process. Efforts have been made to develop silicone hydrogel formulations that can be adequately washed in water without the use of volatile organic solvents. However, certain lens formulations result in lenses with surface distortions after being washed in water. Additional wet-processing methods that do not employ volatile organic solvents are desirable for manufacturing distortion-free contact lenses.

Some patent documents describing wet-processing methods of silicone hydrogel contact lenses include U.S. Publ. No. 2007/0228585, U.S. Publ. No. 2007/138668, U.S. Pat. No. 6,765,083, U.S. Publ. No. 2004/0091613, and U.S. Publ. No 2012/0220689.

SUMMARY

A method of manufacturing a silicone hydrogel contact lens comprises curing a polymerizable composition comprising a siloxane monomer and a hydrophilic monomer to form a cured silicone hydrogel contact lens; hydrating the cured silicone hydrogel contact lens; extracting the hydrated silicone hydrogel contact lens with an extraction liquid comprising an aqueous solution of an organic solvent selected from ethyl lactate, or ethylene carbonate, or propylene carbonate, or propylene glycol, or butanediol, or any combination thereof to make an extracted silicone hydrogel contact lens; removing organic solvent from the extracted silicone hydrogel contact lens to make an ophthalmically-acceptable lens; and packaging the ophthalmically-acceptable lens.

DETAILED DESCRIPTION

Provided herein are methods for manufacturing silicone hydrogel contact lenses to provide ophthalmically-acceptable, distortion-free lenses without the use of volatile organic solvents in the manufacturing process. The method comprises curing a polymerizable composition comprising a siloxane monomer and a hydrophilic monomer to form a cured silicone hydrogel contact lens; hydrating the cured silicone hydrogel contact lens; extracting the hydrated silicone hydrogel contact lens with an extraction liquid comprising an aqueous solution of a non-volatile organic solvent, wherein the extraction liquid has a flash point of at least 50° C.; removing the organic solvent from the extracted silicone hydrogel contact lens to make an ophthalmically-acceptable lens; and packaging the ophthalmically-acceptable lens.

The polymerizable composition comprises a siloxane monomer and a hydrophilic monomer. As used herein, the term monomer refers to any molecule capable of reacting with other molecules that are the same or different, to form a polymer or copolymer. Thus, the term encompasses polymerizable pre-polymers and macromers, there being no size-constraint of the monomer unless indicated otherwise. A siloxane monomer is any polymerizable molecule containing at least one Si—O group. Exemplary siloxane monomers are described in U.S. Publ. No 2012/0220689, incorporated herein by reference. In specific examples, the hydrophilic monomer is a vinyl-containing monomer selected from N-vinyl-N-methyl acetamide (VMA), or N-vinyl pyrrolidone (NVP), or 1,4-butanediol vinyl ether (BVE), or ethylene glycol vinyl ether (EGVE), or diethylene glycol vinyl ether (DEGVE), or any combination thereof. One or more additional monomers may be included in the polymerizable composition. Exemplary monomers include methyl methacrylate (MMA), 2-hydroxybutyl methacrylate (HOB), tert butyl methacrylate (tBMA), N,N-dimethylacrylamide (DMA), 2-hydroxyethyl methacrylate (HEMA), ethoxyethyl methacrylamide (EOEMA), ethylene glycol methyl ether methacrylate (EGMA), isobornyl methacrylate (IBM), and combinations thereof. The polymerizable composition typically includes a cross-linking agent. Exemplary cross-linking agents include diethyleneglycol divinyl ether, or triethyleneglycol divinyl, or triethylene glycol dimethacrylate, or ethylene glycol dimethacrylate, or any combination thereof. Exemplary polymerizable compositions are described in U.S. Publ. No 2012/0220689. In a specific example, the polymerizable composition is free of an organic solvent.

The polymerizable composition can be cured using methods known in the art. In a specific example, the polymerizable composition is cast molded between molds formed of a thermoplastic polymer. The thermoplastic polymer is typically a non-polar material, such as polypropylene, but polar mold materials are also used in the field. Briefly, a first mold member defining the front surface of the contact lens, referred to as a "female mold member", is filled with an amount of the polymerizable composition sufficient to form a contact lens. A second mold member defining the back (i.e. eye-contacting) surface of the contact lens, referred to as the "male mold member", is coupled to the female mold member to form a mold assembly having a lens-shaped cavity with the amount of polymerizable composition therebetween. The polymerizable composition within the contact lens mold assembly is polymerized using any suitable curing method. Typically, the polymerizable composition contains a photoinitiator or a thermal initiator and is cured using UV-curing or thermal-curing, respectively.

At the completion of curing, the male and female mold members are demolded, i.e. separated, and the cured contact lens is removed, i.e. delensed, from the mold member to which it is adhered. These processes are referred to as demolding and delensing, respectively, and a variety of such methods are known to those of ordinary skill in the field. In some methods, the demolding and delensing processes can comprise a single process step, such as when the molds are separated using a liquid which also removes the polymeric lens body from the mold. In other methods, such as when a dry-demolding process is used, the polymeric lens body typically remains on one of the mold members and is delensed in a subsequent process step. Delensing can also be a wet or dry process. In one example, delensing is carried out by a "float off" method in which the mold member to which a polymeric lens body is adhered is immersed in water, such as described in the example section below. The water may optionally be heated (e.g. up to about 100° C.). Typically, the polymeric lens bodies float off of the mold members in about ten minutes. Dry delensing can be carried out manually, for example using tweezers to remove the polymeric lens bodies from the mold member, or they can be removed using an automated mechanical process, such as described in U.S. Pat. No. 7,811,483. Additional demolding and delensing methods for silicone hydrogel contact lenses are described in US Publ No. 2007/0035049.

As used herein, the term hydrating means contacting the cured silicone hydrogel contact lens with an aqueous liquid free of organic solvent to partially or fully hydrate the silicone hydrogel. Typically, the hydrating liquid will be water, optionally with surfactant or other additive. In the case of a float-off process the cured silicone hydrogel is hydrated as part of the delensing step. In a specific example, the hydrating step comprises contacting the cured silicone hydrogel contact lens with water at a temperature of at least 40° C., 50° C., or 60° C. up to about 75° C., 85° C., or 90° C. In specific examples, the contact lens is contacted with the water for about 30 to 90 minutes. Throughout this description, when a series of lower limit ranges and a series of upper limit ranges are provided, all combinations of the provided ranges are contemplated as if each combination were specifically listed. For example, in the above listing of temperatures, all 9 possible temperature ranges are contemplated (i.e. 40-75° C., 50-75° C., 60-85° C., 60-90° C.) as if each were individually recited.

After the hydrating step, the hydrated silicone hydrogel contact lens is contacted with an extraction liquid comprising an aqueous solution of a non-volatile organic solvent. The extraction liquid has a flash point of at least 50° C., and in some examples, at least 55° C., 60° C., or 70° C. Exemplary non-volatile organic solvents include ethyl lactate, or ethylene carbonate, or propylene carbonate, or propylene glycol, or butanediol, or any combination thereof. In various examples, the extraction liquid comprises from about 10, 20, or 30 wt. % up to about 60, 70 or 80 wt. % of the organic solvent, with the remainder being water. In one example, the extraction liquid comprises from about 20 wt. % up to about 80 wt. % of the organic solvent. In a specific example, the extraction liquid comprises from about 30 wt. % to about 60 wt. % ethyl lactate. The extraction liquid may be room temperature or heated at a temperature of about 40° C. or 50° C. up to about 60° C. or 70° C. The hydrated silicone hydrogel contact lens may be contacted with the extraction liquid for about 15, 30 or 45 minutes, up to about 60, 90, or 120 minutes. When the organic solvent used in the extraction liquid is ethyl lactate, hydrolysis of the ethyl lactate may occur forming lactic acid and ethanol. In a large-scale manufacturing facility the concentrations of ethyl lactate and formed ethanol in an extraction tank can be monitored by refractive index and pH. An example of a monitoring log is shown in Example 2.

After the extraction step, the extraction liquid retained by the silicone hydrogel contact lens is removed, for example by rinsing in DI water. The rinsing step may be done at room temperature, or elevated temperatures may be used. In a specific example, the extracted silicone hydrogel contact lens is immersed in water for 10 minutes, and then re-immersed in fresh water for an additional 10 minutes, with this step repeated for a total of 4-5 rinses. In a specific example, the extraction liquid and any other liquid used in treating the cured or hydrated silicone hydrogel contact lens has a flash point of at least 50° C. or 60° C. In a specific example, the method provides an ophthalmically-acceptable silicone hydrogel contact lens having minimal (i.e. acceptable levels of) surface distortions, whereas a lens made from the same polymerizable composition has unacceptable surface distortion when extracted in water without any organic solvent.

After washing, and any optional surface modifications, the hydrated polymeric lens body is typically placed into a blister package, glass vial, or other appropriate container, all referred to herein as "packages." A packaging solution is also added to the container, which is typically a buffered saline solution such as phosphate- or borate-buffered saline. The packaging solution may optionally contain additional ingredients such as a comfort agent, a hydrophilic polymer, a surfactant or other additive that prevents the lens from sticking to the container, etc. The package is sealed, and the sealed polymeric lens body is sterilized by sterilizing amounts of radiation, including heat or steam, such as by autoclaving, gamma radiation, e-beam radiation, ultraviolet radiation, etc. The final product is a sterile, packaged ophthalmically-acceptable contact lens.

The following Examples illustrate certain aspects and advantages of the present invention, which should be understood not to be limited thereby.

EXAMPLE 1

Silicone Hydrogel Contact Lens Fabrication

The chemical compounds listed in the Table 1 were weighed and mixed together to form a polymerizable composition, where unit amount is by weight. The composition was filtered using a 0.2-5.0 micron filter and stored for up to about 2 weeks at 2-10° C. prior to cast molding and curing.

TABLE 1

| Component | Unit Amount |
|---|---|
| Silicone monomer designated "Si-1" in U.S. Publ. No 2012/0220689 | 30 |
| Silicone monomer designated "Si-2" in U.S. Publ. No 2012/0220689 | 7 |
| N-vinyl-N-methylacetamide | 45 |
| methyl methacrylate | 12 |
| ethylene glycol methyl ether methacrylate | 6 |
| 4-butanediol vinyl ether | 5 |
| triethylene glycol dimethacrylate | 1.4 |
| triethyleneglycol divinyl ether | 0.2 |
| Diphenyl (P-vinylphenyl)phosphine (CAS no. 40538-11-2) | 0.5 |
| 2,2'-Azobis-2-methyl propanenitrile | 0.5 |
| 2-Propenoic acid,2-methyl-,1,1'-[(9,10-dihydro-9,10-dioxo-1,4-anthracenediyl)bis(imino-2,1-ethanediyl)]ester (CAS no. 121888-69-5) | 0.01 |
| 2-(3-(2H-benzotriazol-2-YL)-4-hydroxy-phenyl)ethyl methacrylate (CAS no. 96478-0-0) | 1.8 |

The polymerizable composition was cast molded by placing a volume of the composition on a female mold member and fitting a male mold member thereon to form a contact lens mold assembly. The female and male mold members were made from a non-polar resin (e.g. polypropylene). The polymerizable composition was thermally cured to form a polymeric lens body by placing the mold assembly in a nitrogen oven at the following cycle: 30 min. $N_2$ purging at room temperature, 40 min. at 55° or 65° C., 40 min. at 80° C., and 40 min. at 100° C.

After curing, the male and female mold members were separated and the mold half to which the cured contact lens was adhered was contacted with 80° C. water for 30 minutes to allow the lens to hydrate and float off the mold half. The hydrated lenses were then immersed in an extraction liquid as summarized in Table 2, where the extraction liquid was room temperature water (control) or an aqueous solution of 20 or 25 wt. % ethyl lactate (EL) at room temperature or 50° C. The treatment time was 30 or 60 minutes, followed by three 10-minute rinses in room temperature DI water.

TABLE 2

| EL conc. (%) | temp (° C.) | time (min) |
|---|---|---|
| 0 | RT | 60 |
| 25 | RT | 60 |
| 25 | RT | 30 |
| 20 | 50 | 60 |
| 20 | 50 | 30 |

The control lenses had significant distortion including dimples, wrinkles, and wavy edges. In contrast, all the lenses extracted with an aqueous solution of ethyl lactate had no or minimal distortion.

EXAMPLE 2

Monitoring Ethanol Formation in Manufacturing Tank

Refractive index (RI) and pH measurements were used to monitor hydrolysis of ethyl lactate in a manufacturing-scale extraction tank after each batch of contact lenses were extracted. The results are shown in Table 3.

TABLE 3

| Run # | Tank Time | RI | pH | EL Conc. (wt %) | ETOH Conc. (wt %) |
|---|---|---|---|---|---|
| 1 | T0 | 1.3788 | 3.325 | 51.16 | 0.01 |
| 1 | T1 | 1.3788 | 3.335 | 51.16 | 0.01 |
| 1 | T2 | 1.3788 | 3.275 | 51.11 | 0.01 |
| 1 | T3 | 1.3767 | 3.240 | 48.66 | 0.01 |
| 1 | T4 | 1.3770 | 3.090 | 48.91 | 0.03 |
| 2 | T5 | 1.3761 | 3.100 | 47.86 | 0.02 |
| 2 | T6 | 1.3759 | 2.985 | 47.54 | 0.04 |
| 3 | T7 | 1.3750 | 2.995 | 46.46 | 0.04 |
| 3 | T8 | 1.3750 | 2.880 | 46.40 | 0.06 |
| 4 | T9 | 1.3743 | 2.890 | 45.60 | 0.06 |
| 4 | T10 | 1.3740 | 2.820 | 45.18 | 0.08 |
| 5 | T11 | 1.3727 | 2.825 | 43.62 | 0.08 |
| 5 | T12 | 1.3732 | 2.760 | 44.11 | 0.11 |
| 6 | T13 | 1.3724 | 2.760 | 43.15 | 0.11 |
| 6 | T14 | 1.3725 | 2.710 | 43.28 | 0.14 |
| End of Day 1 | T14-1 | 1.3736 | 2.665 | 44.53 | 0.17 |
| Start of Day 2 | T14-2 | 1.3739 | 2.170 | 41.33 | 1.56 |
| 7 | T15 | 1.3725 | 2.155 | 39.36 | 1.67 |
| 7 | T16 | 1.3723 | 2.135 | 38.67 | 1.83 |
| 8 | T17 | 1.3717 | 2.150 | 38.25 | 1.71 |
| 8 | T18 | 1.3717 | 2.120 | 37.57 | 1.96 |
| 9 | T19 | 1.3712 | 2.145 | 37.55 | 1.74 |
| 9 | T20 | 1.3708 | 2.130 | 36.79 | 1.87 |
| 10 | T21 | 1.3701 | 2.140 | 36.12 | 1.79 |
| 10 | T22 | 1.3701 | 2.130 | 35.95 | 1.87 |
| 11 | T23 | 1.3697 | 2.125 | 35.28 | 1.91 |
| 11 | T24 | 1.3697 | 2.090 | 34.43 | 2.24 |
| 12 | T25 | 1.3692 | 2.120 | 34.56 | 1.96 |
| 12 | T26 | 1.3693 | 2.070 | 33.39 | 2.46 |

Although the disclosure herein refers to certain illustrated examples, it is to be understood that these examples are presented by way of example and not by way of limitation. The intent of the foregoing detailed description, although discussing exemplary examples, is to be construed to cover all modifications, alternatives, and equivalents of the examples as may fall within the spirit and scope of the invention as defined by the additional disclosure.

A number of publications and patents have been cited hereinabove. Each of the cited publications and patents are hereby incorporated by reference in their entireties.

The invention further provides:

1. A method of manufacturing a silicone hydrogel contact lens comprising: curing a polymerizable composition comprising a siloxane monomer and a hydrophilic monomer to form a cured silicone hydrogel contact lens; hydrating the cured silicone hydrogel contact lens; and extracting the hydrated silicone hydrogel contact lens with an extraction liquid comprising an aqueous solution of an organic solvent, wherein the extraction liquid has a flash point of at least 50° C.

2. The method of 1, wherein the organic solvent is selected from ethyl lactate, or ethylene carbonate, or propylene carbonate, or propylene glycol, or butanediol, or any combination thereof.

3. The method of 1 or 2, wherein the extraction liquid comprises from about 20 wt. % up to about 80 wt. % of the organic solvent.

4. The method of any one of 1 to 3, wherein the hydrating comprises contacting the cured silicone hydrogel contact lens with water at a temperature of at least 50° C.

5. The method of any one of 1 to 4, wherein the polymerizable composition is cured in a mold assembly which is demolded after curing to provide a mold assembly half with the cured silicone hydrogel contact lens adhered thereto, and wherein the hydrating step comprises delensing the cured silicone hydrogel contact lens from the mold assembly half by contacting the hydrogel and mold assembly half with an aqueous liquid free of organic solvent.

6. The method of any one of 1 to 5 wherein the organic solvent is removed from the extracted silicone hydrogel contact lens by rinsing the extracted silicone hydrogel contact lens in room temperature water.

7. The method of any one of 1 to 6, wherein the hydrated silicone hydrogel contact lens has surface distortions that are reduced after the extraction and/or removing step.

8. The method of any one of 1 to 7, wherein the polymerizable composition is free of an organic solvent.

9. The method of any one of 1 to 8, wherein the hydrophilic monomer is N-vinyl-N-methyl acetamide (VMA), or N-vinyl pyrrolidone (NVP), or 1,4-butanediol vinyl ether (BVE), or ethylene glycol vinyl ether (EGVE), or diethylene glycol vinyl ether (DEGVE), or any combination thereof.

10. The method of any one of 1 to 9, wherein the organic solvent is ethyl lactate.

11. The method of 10, wherein formation of ethanol in the extraction liquid is monitored by pH and/or refractive index measurement.

12. An ophthalmically-acceptable contact lens made by the method of any one of 1 to 11.

What is claimed is:

1. A method of manufacturing a silicone hydrogel contact lens comprising:
curing a polymerizable composition comprising a siloxane monomer and a hydrophilic monomer to form a cured silicone hydrogel contact lens;
hydrating the cured silicone hydrogel contact lens;
extracting the hydrated silicone hydrogel contact lens with an extraction liquid comprising an aqueous solution of a single organic solvent selected from ethyl lactate, or ethylene carbonate, or propylene carbonate, or propylene glycol, or butanediol, to make an extracted silicone hydrogel contact lens;

removing organic solvent from the extracted silicone hydrogel contact lens to make an ophthalmically-acceptable lens; and packaging the ophthalmically-acceptable lens, wherein:

the extraction liquid and any other liquid used for processing the cured or hydrated silicone hydrogel contact lens has a flash point of at least 50° C.; and the hydrated silicone hydrogel contact lens has surface distortions that are reduced after the extraction and/or removing step.

2. The method of claim 1, wherein the extraction liquid comprises from about 20 wt. % up to about 80 wt. % of the organic solvent.

3. The method of claim 1, wherein the hydrating comprises contacting the cured silicone hydrogel contact lens with water at a temperature of at least 50° C.

4. The method of claim 1, wherein the polymerizable composition is cured in a mold assembly which is demolded after curing to provide a mold assembly half with the cured silicone hydrogel contact lens adhered thereto, and wherein the hydrating step comprises delensing the cured silicone hydrogel contact lens from the mold assembly half by contacting the hydrogel and mold assembly half with an aqueous liquid free of organic solvent.

5. The method of claim 1, wherein the removing step comprises rinsing the extracted silicone hydrogel contact lens in room temperature water.

6. The method of claim 1, wherein the polymerizable composition is free of an organic solvent.

7. The method of claim 1, wherein the organic solvent is ethyl lactate and wherein formation of ethanol in the extraction liquid is monitored by pH and/or refractive index measurement.

8. The method of claim 1, wherein the hydrophilic monomer is N-vinyl-N-methyl acetamide (VMA), or N-vinyl pyrrolidone (NVP), or 1,4-butanediol vinyl ether (BVE), or ethylene glycol vinyl ether (EGVE), or diethylene glycol vinyl ether (DEGVE), or any combination thereof.

9. The method of claim 7, wherein formation of ethanol in the extraction liquid is monitored by pH and/or refractive index measurement.

10. The method of claim 1, wherein the organic solvent is selected from ethyl lactate, or ethylene carbonate, or propylene carbonate, or butanediol.

* * * * *